(12) United States Patent
Williams

(10) Patent No.: US 7,258,044 B2
(45) Date of Patent: Aug. 21, 2007

(54) APPARATUS AND PROCESS FOR CUTTING OF EXTRUDED MATERIAL

(75) Inventor: Edward E. Williams, St. Louis, MO (US)

(73) Assignee: Good Earth Tool Company, Crystal City, MO (US)

( * ) Notice: Subject to any disclaimer, the term of this patent is extended or adjusted under 35 U.S.C. 154(b) by 0 days.

(21) Appl. No.: 10/465,422

(22) Filed: Jun. 19, 2003

(65) Prior Publication Data

US 2004/0035270 A1    Feb. 26, 2004

Related U.S. Application Data

(62) Division of application No. 09/777,735, filed on Feb. 6, 2001, now Pat. No. 7,181,993.

(51) Int. Cl.
*B21K 21/00* (2006.01)

(52) U.S. Cl. ............... 76/101.1; 83/663; 83/675; 83/698.11; 83/676; 425/113; 76/112

(58) Field of Classification Search ............ 83/663, 83/13, 698.11, 698.41, 675, 677, 678, 591–596, 83/676, 694; 425/313, 311, 308, 307, 316; 76/101.1, 112, 115; 29/557, 428; 264/148–151
See application file for complete search history.

(56) References Cited

U.S. PATENT DOCUMENTS

| | | | | |
|---|---|---|---|---|
| 1,762,111 A | * | 6/1930 | Weddell | ............... 407/38 |
| 3,196,487 A | * | 7/1965 | Snelling | ............... 425/168 |
| 3,266,090 A | | 8/1966 | Gosney | |
| 3,299,917 A | | 1/1967 | Pearson | |
| 3,317,957 A | * | 5/1967 | Heston et al. | ............ 425/67 |
| 3,624,830 A | * | 11/1971 | Stehower et al. | ......... 99/510 |
| 3,785,417 A | * | 1/1974 | Vora | ............... 144/221 |
| 4,251,198 A | * | 2/1981 | Altenburg | ............ 425/67 |
| 4,252,519 A | | 2/1981 | Farmer et al. | |
| 4,281,980 A | | 8/1981 | Hoagland et al. | |
| 4,319,507 A | | 3/1982 | Kondo et al. | |
| 4,462,293 A | | 7/1984 | Gunzner | |
| 4,529,370 A | | 7/1985 | Holmes et al. | |
| 4,680,191 A | | 7/1987 | Budd et al. | |
| 4,728,275 A | | 3/1988 | DiLullo et al. | |
| 4,800,792 A | * | 1/1989 | Bertolotti | ............ 83/356.3 |
| 5,054,354 A | | 10/1991 | Kubis | |
| 5,320,793 A | | 6/1994 | Lombard | |
| 5,338,559 A | * | 8/1994 | Schaaf | ............ 426/448 |

(Continued)

*Primary Examiner*—Kenneth E. Peterson
*Assistant Examiner*—Omar Flores Sánchez
(74) *Attorney, Agent, or Firm*—Storm LLP; Paul V. Storm; John J. Patti

(57) ABSTRACT

A rotating cutting apparatus comprising a cutting blade holder with at least one hole on the outside diameter of the cutting blade holder into which cutting blades are inserted and bonded to the cutting blade holder. The cutting blade holder encloses a center hole, so that the rotating cutting apparatus can be mounted to a drive shaft of machinery or secured to a cup that can be mounted to the drive shaft of machinery and driven by the machinery. The cutting blade holder can be made of a less expensive material, with only the cutting blade being made of higher-grade materials that maintains its cutting edge well. Additionally, in some arrangements of the present invention, the cutting blade may be sharpened on two sides so that the rotating cutting apparatus can be used for longer periods of time.

10 Claims, 3 Drawing Sheets

U.S. PATENT DOCUMENTS

| | | |
|---|---|---|
| 5,367,928 A | 11/1994 | Geiser et al. |
| 5,593,702 A * | 1/1997 | Harris et al. ............... 425/67 |
| 5,611,983 A | 3/1997 | Ma et al. |
| 5,927,129 A | 7/1999 | Thoms et al. |
| 5,947,805 A | 9/1999 | Van Osenbruggen |
| 6,189,584 B1 | 2/2001 | Cayce |
| 6,310,314 B2 | 10/2001 | Nobauer et al. |
| 6,488,456 B1 | 12/2002 | Satran et al. |
| 6,536,320 B2 | 3/2003 | Seyna et al. |
| 2007/0034067 A1* | 2/2007 | Williams ................ 83/663 |

* cited by examiner

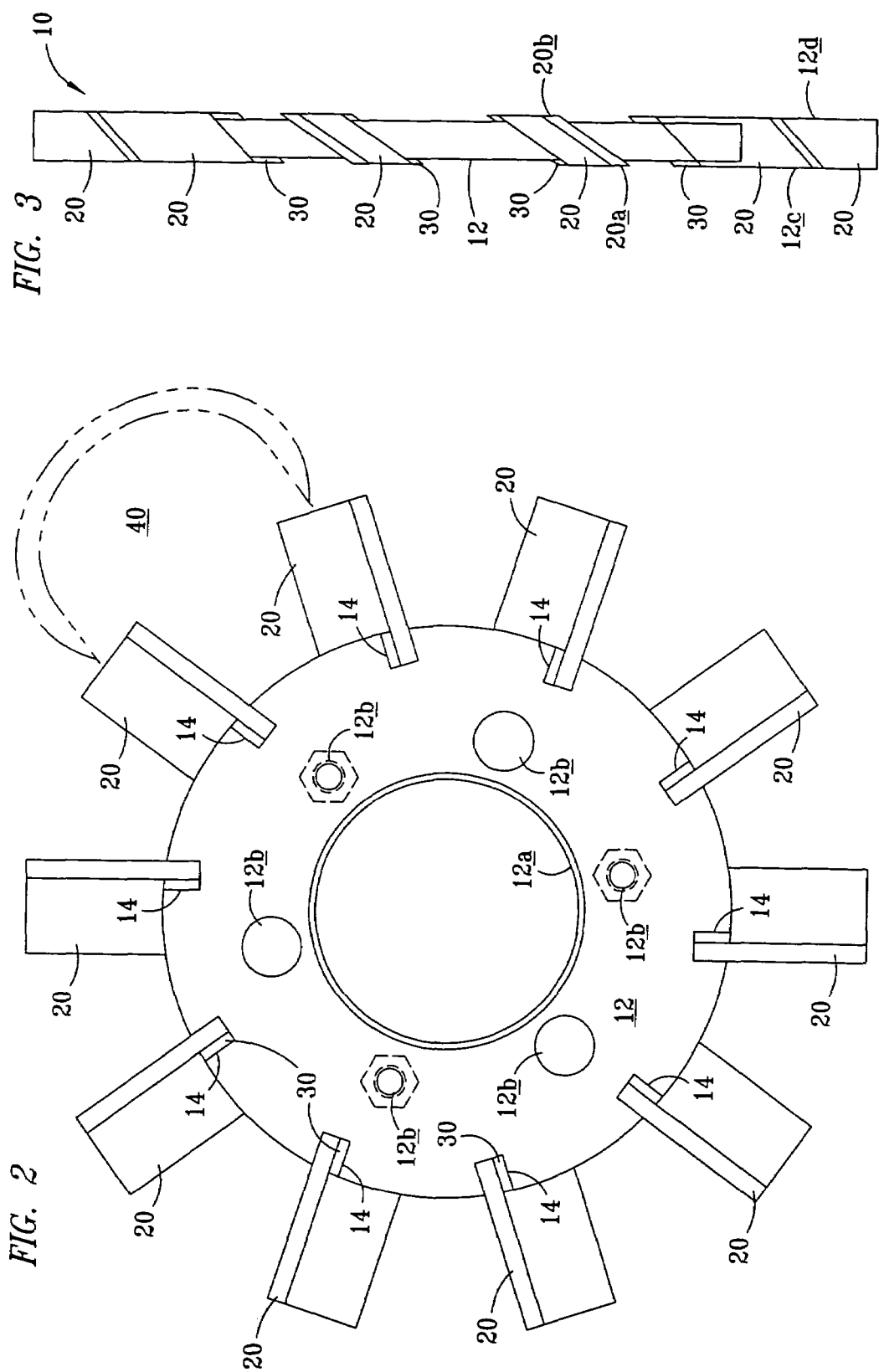

# APPARATUS AND PROCESS FOR CUTTING OF EXTRUDED MATERIAL

CLAIM OF PRIORITY

This application is a Divisional application of U.S. patent application Ser. No. 09/777,735, filed on Feb. 6, 2001 now U.S. Pat. No. 7,181,993.

TECHNICAL FIELD

The present invention relates generally to the cutting of materials produced in a manufacturing process, and more particularly to materials produced in extrusion manufacturing processes.

BACKGROUND OF THE INVENTION

The invention relates generally to the cutting of materials during a manufacturing process, and more particularly, cutting materials delivered from an extrusion process.

It is known in manufacturing to produce a material in a continuously extruded stream, and cut the material to a desired size(s) as it leaves the extruder. In extrusion manufacturing processes, cutting blades may be used to cut materials being extruded, with the cutting blades often being mounted to the hub, or end, of extrusion machinery.

Conventionally, a cutting blade is made of a single piece of high-grade metal, often hardened, which has cutting edges formed integrally with the body portion, the cutting edges being sharpened by using grinding, machining, or similar techniques. The prior art discloses cutting blades made of a single cast, died or cut material that is then sharpened along the edge. One practical drawback of this conventional technology is that when the cutting edge(s) becomes dull, the production process must be shut down so that the cutting blade may be removed, sharpened and re-installed, or replaced with a new blade. Further, dull blades can lead to misshapen products. The cost of blades, along with the cost of lost production time when the process had to be stopped for the blades to be replaced can be high, in part because the entire cutting mechanism is made from a single, relatively expensive, material.

The foregoing problems have been mitigated in some cases where the blades are sharpened on both sides, which reduces the frequency of sharpening, but the blades are still expensive. With such a configuration, when the initial edges become dull, the entire cutting head is removed, reversed, and reattached so that a new set of sharp edges are available for use. To compensate for such expense, separate cutting blades, which may be sharpened or replaced individually, may be attached to a cutting blade holder, which is secured to the hub or end of the extrusion machinery. Generally, cutting blades are attached to the cutting blade holder using screws. Difficulty occurs when the screws used to attach the blades loosen during use. This requires the process to be shut down so that the screws can be tightened or replaced. Also, the tolerance between the blade and extruder equipment is very tight, frequently less than a few thousandths of an inch, to ensure precise metering of product. Harder materials, such as various forms of carbide, are not suitable for use as a single, integral piece because the carbide is too brittle to be worked in this configuration, and such large pieces of carbide would be very expensive.

What is needed, therefore, is a method and apparatus for cutting extruded materials that enables cutting blades to have longer cutting life, and that are relatively easy and inexpensive to replace when the cutting edge is no longer sharp.

SUMMARY OF THE INVENTION

The present invention, accordingly, provides for bonding individual cutting blades to a securing mechanism to produce a less expensive cutting mechanism that is light-weight enough to not distort the product being cut. To this end, a cutting blade holder with at least two channels in the edge is used, and a cutting blade is inserted in each channel on the cutting blade holder, and bonded to the cutting blade holder. Alternatively, each cutting blade may be bonded to a separate cutting blade holder, with at least two such assemblies secured to a rotatable cup attachable to a rotating mechanism such as an extruder shaft.

In one arrangement, the cutting blade holder circumscribes a circular opening that fits over the end or hub of the extrusion machinery. In an alternative arrangement of the invention, the cutting blade holder circumscribes a slot that can be attached to a commercially available cup or cutter head that fits over the end or hub of the extrusion machinery.

An advantage achieved with the present invention is that only the cutting blades need to be made of a high-quality, wear-resistant metal, such as tungsten carbide or carbide coated metals. The cutting blade holder may be made of a material such as a mild steel, which may be bonded to the cutting blades, thus reducing overall material costs substantially.

Another advantage achieved with the present invention is that the cutting blades may be readily secured into the cutting blade holder by means such as brazing or use of a bonding material, which bonds the cutting blade holder and cutting blade materials together when heated. This reduces the time necessary to secure blades to the cutting blade holder by eliminating the need to drill holes in the cutting blades and cutting blade holder and then using screws or other fastening hardware to hold the pieces together. Depending on the bonding material used, this process may be reversed and repeated when replacement blades need to be secured to the cutting blade holder.

A further advantage achieved with the present invention is that the weight of the assembled cutting blade assembly is less than those in which cutting blades are secured to the cutting blade holder with screws or other mechanical devices, resulting in fewer problems of deformation of the cut product being produced due to the weight of the cutting blade assembly. This is especially important with products that are very lightweight, fine or small in size, and therefore more likely to be deformed.

Still another advantage achieved with the present invention is that in certain arrangements, the cutting blade may be sharpened on both sides so that when the cutting edge on one side of the blades becomes dull, the cutting blade holder may be reversed on the mounting hub. This lengthens the amount of time a cutting mechanism may be used before it must be removed and sharpened, resulting in less down time on production lines.

As a result of the foregoing, another advantage achieved with the present invention is that when old cutting blades may not be sharpened again and ultimately need to be replaced, the old cutting blades may be de-bonded, and the cutting blade holder may be reused with new cutting blades secured thereto, further reducing costs.

Another advantage achieved with the present invention is that after the cutting blade is secured into the cutting blade holder, the cutting blade may be sharpened as necessary to ensure the cutting edge is flat and perpendicular to the material being cut, thus ensuring the material is not deformed when it is being cut.

Another advantage achieved with the present invention is that the number cutting blades around the diameter of the extrusion drive machinery may be increased because the width and weight of the cutting blade assembly is reduced. More cutting blades results in more frequent cuts, and thus reduces the speed at which the cutting mechanism needs to rotate for a given size of cut, which reduces the wear on the equipment. The rotating speed is typically between 1 and 1500 revolutions per minute (RPM), with 600 RPM being an optimal rotating speed.

BRIEF DESCRIPTION OF THE DRAWINGS

FIG. 2 is a view of a cutting blade assembly secured to an extrusion device that embodies the features of one arrangement of the present invention.

FIG. 3 is a cross-section view a portion of a cutting blade assembly taken along line 3-3 of FIG. 2, showing the positioning of the cutting blade in relation to the cutting blade holder.

DETAILED DESCRIPTION OF THE PREFERRED EMBODIMENT

Figure 1:
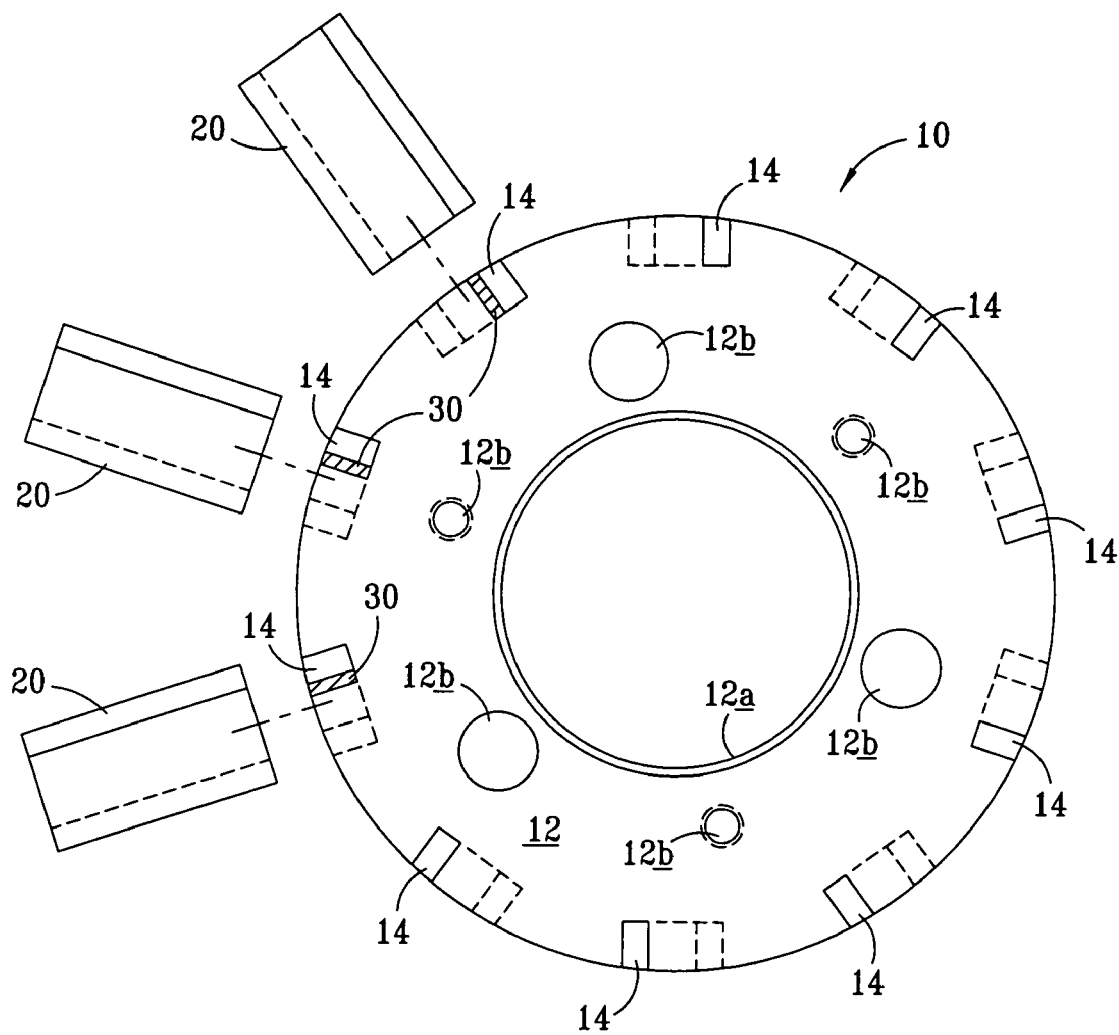
FIG. 1 is an exploded view of one arrangement of the present invention showing a cutting blade assembly.

Referring now to FIG. 1, the reference numeral 10 designates, in general, a cutting blade assembly embodying features of one arrangement of the present invention. As viewed in FIG. 1, the cutting blade assembly 10 includes a cutting blade holder made of a first material 12, with channels 14 into which a cutting blade 20 is inserted and secured by means of a bonding material 30. The cutting blade holder 12 is preferably made of a material such as a mild steel or other material that is relatively inexpensive. Typically, such materials have a coefficient of thermal expansion of 0.000007 in./degree Fahrenheit. The cutting blade holder 12 defines a center opening 12a and holes 12b. The number of channels 14 in the cutting blade holder 12 may be varied to adapt the cutting blade assembly 10 to the material being cut, and the frequency of cuts to be made in the material. The cutting blade 20 is preferably made of a second material different from the first material, such as carbide, tungsten carbide or the like that can be sharpened and will retain a sharp edge. The cutting blade 20 is aligned in the channel 14 in the cutting blade holder 12, and secured by means of a bonding material 30, such as solder and the like, that preferably chemically bonds to the materials of the cutting blade holder 12 and cutting blade 20. In some cases, the bonding material 30 used must be heated to stimulate the chemical reaction, and the bond becomes permanent when the material 30 is returned to normal room temperature.

Referring now to FIG. 2, an assembled view of a first arrangement of the cutting blade assembly 10, it can be seen that the cutting blade holder 12 is preferably configured with a number of channels 14 angularly spaced apart from each other about the center opening 12a of the cutting blade holder 12, each of which channels is configured to receiving one end of a cutting blade 20, secured in the channel 14 with a bonding material 30. Each channel 14 extends longitudinally (across the width of the outer periphery of the cutting blade holder 12) at an acute angle relative to a plane traverse or perpendicular to the rotational axis of the cutting blade holder 12 (or parallel to face 12d of the cutting blade holder). Additionally, an opposite second end of the cutting blade 20 preferably remains free-floating, as shown in FIG. 2. The cutting blade holder 12 defines a center opening 12a and drilled holes 12b for use in mounting on a machine shaft 40.

Referring now to FIG. 3, it can be seen that in a first arrangement of the present invention, the cutting blade 20 has a sharpened edge 20a cut at an angle such that the cutting edge is parallel to the face 12c of the cutting blade holder 12. If the cutting blade assembly is to be such that both sides may be used for cutting, both sides of the cutting blade 20 are sharpened, and an opposing edge 20b of the cutting blade 20 is also cut at an angle such that the cutting edge is parallel to a face 12d of the cutting blade holder 12. The centerline of the channel 14 is centered in the thickness of the edge of the cutting blade holder 12. The cutting blade 20 is preferably made of tungsten-carbide, carbide, or other like hardened materials, or made of a less hard material and coated with carbide, tungsten-carbide or other like hardened materials to provide a sharp, long-lasting cutting edge.

Typically, cutting blades 20 are inclined at an angle $\alpha$ with respect to a plane defined by the face 12c of the cutting blade holder, and the blades extend past such plane by a height H. Accordingly, when the cutting blade assembly 10 is placed on a planar surface, such as a flat table, it is supported on the cutting blades 20. For precise, repeatable cuts, each blade must be a repeatable distance from the face of the extruder die when attached for use. To achieve this result, each blade is measured for deviation from a common plane. Typically, the maximum deviation from a common plane between blades is less than 0.005 inches, preferably less than 0.002 inches, and more preferably less than 0.001 inches. Thus, in use, the initial cutting edges of the blades rotate in a planar space not wider than 0.005 inches, preferably not wider than 0.002 inches, and most preferably not wider than 0.001 inches.

Figure 4:
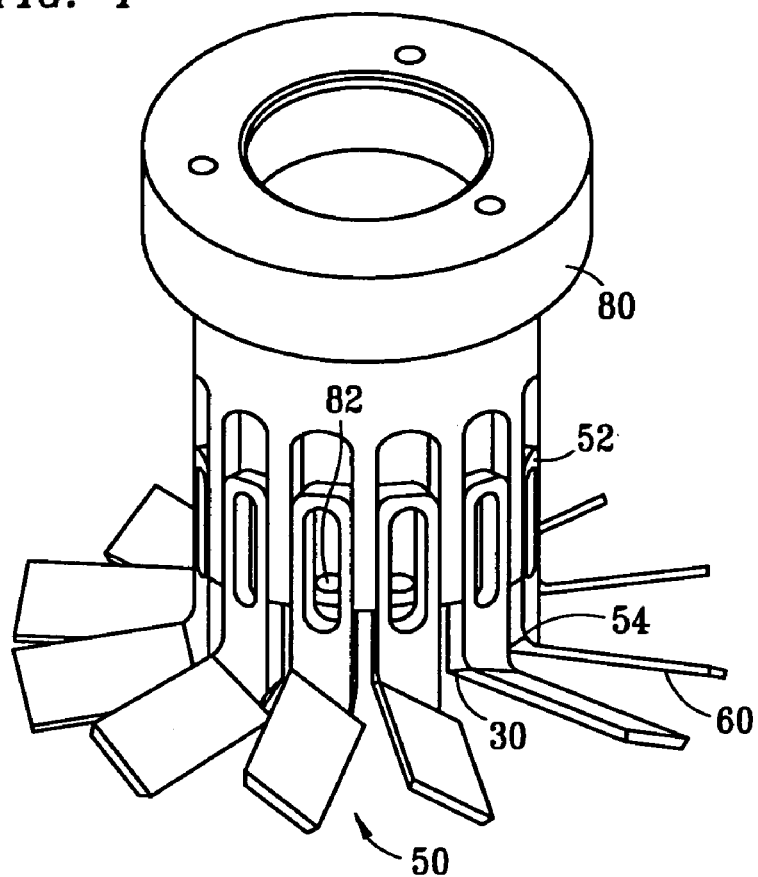
FIG. 4 is a view of another arrangement of the present invention.

Referring now to FIG. 4, the reference numeral 50 designates, in general, a cutting blade assembly embodying features of another arrangement of the present invention. As viewed in FIG. 4, the cutting blade assembly 50 includes a cutting blade holder 52, with a channel 54 along one end into which a cutting blade 60 is inserted and secured by means of a bonding material 30. The cutting blade holder 52 is preferably made of a material such as a mild steel or other material that is inexpensive. The cutting blade holder 52 defines a center opening 52a used to secure the cutting blade assembly 50 to a commercially available cup 80, which is not separately claimed as part of the present invention, by means of a fastening mechanism 82, such as a bolt, machine screw, or the like. The number of cutting blade assemblies 50 attached to the cup 80 may be varied to adapt the cutting blade assembly 50 to the material being cut, and the frequency of cuts to be made in the material. The cup 80 is mounted to the hub end of an extrusion device. The cutting blade 60 is preferably made of a material such as carbide, tungsten carbide or the like that can be sharpened and will retain a sharp edge. The cutting blade 60 is aligned in the channel 54 in the cutting blade holder 52, and secured by means of a bonding material 30, such as solder and the like, that preferably chemically bonds to the materials of the cutting blade holder 52 and cutting blade 60. In some cases, the bonding material 30 used must be heated to stimulate the chemical reaction, and the bond becomes permanent when the bonding material 30 is returned to normal room temperature.

Figure 5:
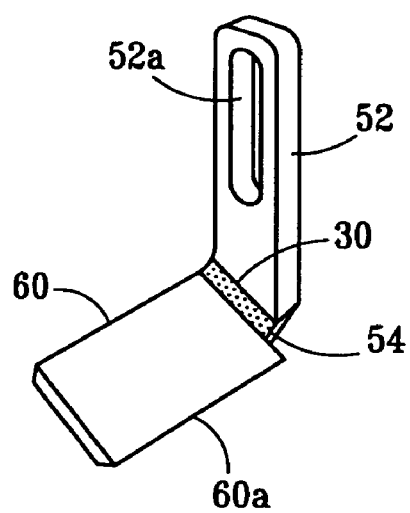
FIG. 5 is a view showing the cutting blade and cutting blade holder in an alternative arrangement of the present invention.

Referring now to FIG. 5, it can be seen that the cutting blade assembly 50 comprises a cutting blade holder 52, a cutting blade 60, and bonding material 30. The cutting blade holder 52 is preferably made of a material such as a mild steel or other material that is inexpensive. The cutting blade holder 52 defines a center opening 52*a* used to secure the cutting blade assembly 50. A channel 54 is contained in end of the cutting blade holder 52. The cutting blade 60 has a sharpened edge 60*a* cut at an angle to the channel 54 that is appropriate for the extrusion mechanism and material being extruded. The cutting blade 60 is preferably made of tungsten-carbide, carbide, or other like hardened materials, or made of a less hard material and coated with carbide, tungsten-carbide or other like hardened materials to provide a sharp, long-lasting cutting edge.

It is understood that the present invention can take many forms and embodiments. The embodiments described herein are intended to illustrate rather than to limit the invention. Accordingly, several variations may be made in the foregoing without departing from the spirit or the scope of the invention. For example, the cutting blade assembly 10, 50 may be attached to a shaft of a machine other than an extrusion machine, or may be secured in a different manner than attaching to a machine shaft. The cutting blade holder 12,52 and cutting blades 20, 60 may be made of a variety of materials, metallic or non-metallic, as appropriate to the cutting function being performed. The bonding material 30 may be solder, or some other glue, bonding material or the like that bonds well with the materials of which the cutting blade holder 12, 52 and the cutting blade 20, 60 are made.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. An apparatus for cutting extruded materials, comprising:
    a generally disc-shaped knife holder made of a first material having a rotational axis, a circumference, and a pair of faces;
    a plurality of generally rectangular channels formed along the circumference of the knife holder, wherein each channel extends longitudinally from the rotational axis at an angle with respect to at least one of the faces, and wherein the rectangular channels are equally spaced;
    a plurality of extruder knives made of a second material, wherein:
        the second material is harder than the first material;
        each extruder knife has a length where the majority of the length extends beyond the circumference;
        each extruder knife has a first end that is brazed into one of the channels; and
        each extruder knife has an opposite second end that is free-floating; and
    at least two cutting edges on each extruder knife, wherein the cutting edges define a pair of generally parallel cutting planes, where each cutting plane is generally parallel to at least one of the faces so that the apparatus for cutting extruded materials is reversible.

2. The apparatus of claim 1, wherein the apparatus further comprises ten cutting channels, which are spaced equidistantly about the circumference of the disc.

3. An apparatus for cutting extruded materials comprising:
    a generally cylindrical cutting blade holder rotatable about a central axis and having a pair of generally circular faces and an outer periphery, wherein the cutting blade holder is made of a first material;
    a plurality of cutting blade channels spaced around the outer periphery, wherein each of the channels extends longitudinally from the central axis at an angle with respect to at least one of the circular faces;
    a plurality of cutting blades made of a second material, wherein each cutting blade has:
        a pair of opposite cutting edges that extend beyond the outer periphery of the cutting blade holder;
        a first end that is brazed in one of the cutting blade channels;
        an opposite second end that is free-floating; and
        a length where the majority of the length extends beyond the outer periphery of the cutting blade holder; and
    at least two cutting planes defined by the cutting edges of the cutting blades such that each cutting plane is generally parallel to at least one of the generally circular faces of the cutting blade holder so that the apparatus for cutting extruded materials is reversible.

4. The apparatus of claim 3 wherein said plurality of cutting blades each have a plurality of initial cutting edges, wherein each of said plurality of cutting edges is aligned with one another and has a maximum deviation from a common plane not greater than 0.005 inches.

5. The apparatus of claim 3 wherein said cutting blade holder is machined from a material that is responsive to a brazing process.

6. The apparatus of claim 3 wherein said apparatus is secured to a machinery drive mechanism.

7. The apparatus of claim 3 wherein said cutting blade holder is molded.

8. The apparatus of claim 3 wherein said second material is a harder material than said first material.

9. The apparatus of claim 3 wherein said cutting blade is made of a carbide material and is sharpened on at least two edges, such that the sharpened edges are substantially parallel to at least one of the generally cylindrical faces of the cutting blade holder.

10. The apparatus of claim 3 wherein said cutting blade is made of some material other than a carbide material coated with a layer of carbide, and thereafter sharpened.

* * * * *